United States Patent
Syrett

(10) Patent No.: US 8,718,337 B1
(45) Date of Patent: May 6, 2014

(54) IDENTIFYING AN INDIVIDUAL FOR A ROLE

(75) Inventor: Matthew Syrett, Los Angeles, CA (US)

(73) Assignee: IMDB.com, Inc., Seattle, WA (US)

( * ) Notice: Subject to any disclaimer, the term of this patent is extended or adjusted under 35 U.S.C. 154(b) by 955 days.

(21) Appl. No.: 12/826,986

(22) Filed: Jun. 30, 2010

(51) Int. Cl.
*G06K 9/46* (2006.01)

(52) U.S. Cl.
USPC .......................................... 382/118; 382/190

(58) Field of Classification Search
USPC ......... 382/118, 190, 156, 254, 291, 181, 155, 382/276, 286, 100, 192, 203; 446/100, 372, 446/391, 268, 337, 321; 375/E7.083, 375/E7.076; 30/47, 527, 50, 532, 32; 705/1–2
See application file for complete search history.

(56) References Cited

U.S. PATENT DOCUMENTS

| | | | | |
|---|---|---|---|---|
| 3,805,238 | A * | 4/1974 | Rothfjell | 382/118 |
| 7,286,692 | B2 * | 10/2007 | Kanarat | 382/118 |
| 7,450,740 | B2 * | 11/2008 | Shah et al. | 382/118 |
| 8,005,270 | B2 * | 8/2011 | Roizen et al. | 382/118 |
| 8,041,082 | B1 * | 10/2011 | Baluja et al. | 382/118 |
| 2005/0043897 | A1 * | 2/2005 | Meyer | 702/19 |
| 2007/0156589 | A1 * | 7/2007 | Zimler et al. | 705/51 |

OTHER PUBLICATIONS

Myheritage Ltd., "MyHeritage.com face recognition—Find the Celebrity in you—MyHeritage.com," located at http://celebrity.myheritage.com/FP/Company/try-face-recognition.php, last accessed on Dec. 9, 2010, 2 pages.

* cited by examiner

*Primary Examiner* — Sheela Chawan
(74) *Attorney, Agent, or Firm* — Novak Druce Connolly Bove + Quigg LLP

(57) ABSTRACT

Systems and methods are provided for identifying an individual(s) whose face closely resembles a face that is ideal for a role, or who has a facial feature or combination of facial features that closely resembles a facial feature or combination of facial features that is ideal for the role, and who—in addition to having an ideal face, facial feature, or combination of facial features—possesses at least one trait or qualification that is preferable for the role. For example, the systems and methods can be used to identify at least one individual, such as an actor or model, whose face or facial features closely resembles a face or facial features that is ideal for a role, such as a role in a recorded or live performance, a photo shoot, or a fashion show, and who possesses the at least one trait or qualification, such as gender, height, weight, ability to speak a particular language, star power, or a guild affiliation, that is preferable for the role.

26 Claims, 5 Drawing Sheets

IDENTIFYING AN INDIVIDUAL FOR A ROLE

BACKGROUND

When casting a role for a movie, television program, commercial, a photo shoot, a fashion show or other acting or modeling job, a person or entity responsible for casting the role typically searches the text of resumes, which sometimes list physical characteristics (e.g., height, eye color, hair color, etc.) and skills (languages spoken, musical ability, etc.) to identify actors, models, or other people who possess certain skills and physical characteristics, as well as other qualifications that are appropriate for the role. Commonly searched-for characteristics, skills, and qualifications include, for example, language spoken, height, weight, age, guild affiliation, previous acting experience, etc. After identifying people who possess some or all of the required characteristics, skills, and/or qualifications, the person or entity responsible for casting the role reviews headshots to identify those persons who also have the "right" look. This can be an onerous process, resulting in a person or entity having to review hundreds or even thousands of headshots.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
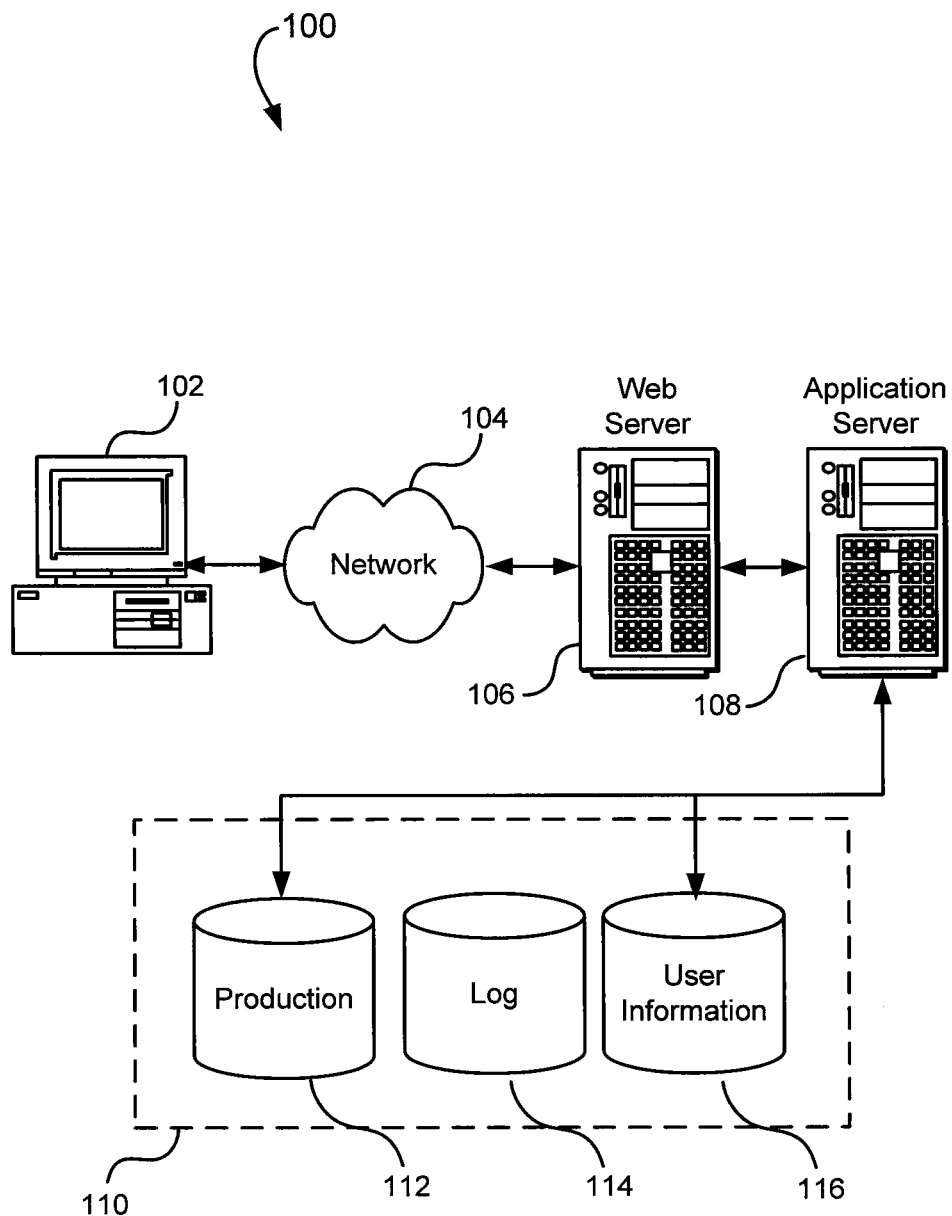
FIG. 1 is a schematic diagram illustrating an environment for implementing aspects, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Systems and methods are provided for identifying one or more individuals who have facial features or combinations of facial features that closely resemble facial features or combinations of facial features that are perceived to be ideal for the role, and who—in addition to having an ideal face, facial features, or combinations of facial features—possess traits and/or qualifications that are preferable for the role. For example, the systems and methods can be used to identify an individual(s), such as an actor or model, whose face closely resembles a face that is ideal for a role, such as a role in a recorded or live performance, a photo shoot, or a fashion show, and who possesses a trait(s) and/or qualification(s), such as gender, height, weight, ability to speak a particular language, star power, or a guild affiliation, that is preferable for the role. Also, for example, the systems and methods can be used to identify an individual(s), such as an actor or model, who has a facial feature or a combination of facial features that closely resembles an ideal facial feature or combination of facial features. It should be understood, however, that the examples disclosed herein are not exhaustive and that many other embodiments would be apparent to one of ordinary skill in the art in light of the teachings and suggestions contained herein. Further, while many examples discussed herein refer to identifying actors and models for roles in live or recorded performances, photo shoots, and fashion shows, it should be understood that many other types of individuals or entities can be identified as being suitable for many different types of projects within the scope of the various embodiments.

It will be helpful to have a brief overview of a method for identifying at least one individual who possesses at least one "desired" facial feature and at least one trait and/or qualification that is preferable for the role. According to this example, embodiments receive a request to identify an individual suitable for a role. The request may be made by a person or entity responsible for casting or otherwise finding and obtaining an individual or individuals for an acting or modeling role in a photo shoot, a fashion show, or a recorded or live performance. The request, according to this example, includes an image or some other representation of an ideal face or of an ideal facial feature or combination of features. It will be appreciated that, instead of or in addition to including the image or some other representation, the request includes a reference to an ideal face or facial feature or combination of facial features. For example, the request may include a reference to the face or a facial feature or a combination of facial features of a known individual, such as an actor or model. Further, it will be appreciated that the request may include a reference to a facial feature or combination of facial features of a known individual as well as a reference to a different feature or combination of features of another known individual. For example, the request may be to identify an individual having the ears of known Actor A, the jaw line of known Actor B, and the eyes and nose of known Actor C. In addition to including an image of, facial data representative of, or a reference to an ideal face or facial feature(s), the request includes a description of at least one trait and/or qualification that an ideal individual for the role should preferably possess.

In the event the request includes an image of the ideal face or facial features, embodiments process the image to extract relevant facial data from the image. In the event the request includes a reference to a known individual's or individuals' face(s) or facial feature(s), embodiments access a data store and obtain relevant facial data from a data store. After obtaining the relevant facial data, embodiments search a data store that contains the facial data and trait/qualification descriptions of a plurality of individuals, such as all professional actors and models, to identify the individual or individuals whose facial data closely matches the facial data extracted from the image(s) or obtained as a result of the image reference(s), and whose trait and/or qualification descriptions match the trait and/or qualification description(s) of the search request. Then, embodiments present the identified individual(s) to the person or entity that submitted the request.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing log data 114, which may be utilized for purposes such as reporting and analysis. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
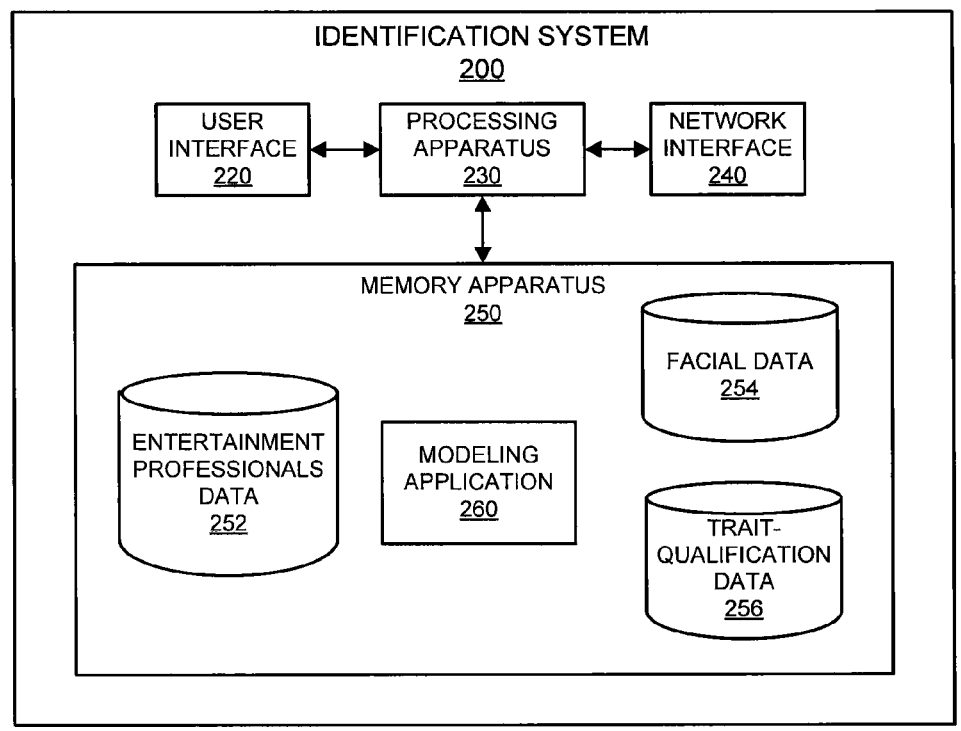
FIG. 2 is a block diagram depicting aspects of a system, in accordance with at least one embodiment.

FIG. 2 provides a block diagram of an identification system 200 for identifying an individual with facial features that closely resemble a face considered ideal for a role and/or who possesses a trait or qualification that is preferable for the role, in accordance with at least one embodiment. The identification system 200 comprises a user-interface apparatus 220, a network-interface apparatus 240, and a memory apparatus 250 operatively coupled to a processing apparatus 230.

As described in greater detail below, embodiments of the identification system 200 are generally configured to identify in a data store an individual(s), such as an actor(s) or model(s), who is suitable for a role, such as a role in a live or recorded performance. To do so, embodiments of the identification system 200 receive a request or query that includes an image or some representation of an ideal face, facial feature, or combination of facial features and a description of at least one physical or character trait or qualification. Embodiments of the identification system 200 then search a data store for an individual: (1) who has a face that resembles the ideal face, or has a facial feature that resembles the ideal facial feature, or has a combination of facial features that resembles the ideal combination of facial features; and (2) who has the at least one trait or qualification. The identification system 200 may, in some embodiments, be integrated with other systems and environments, such as environment 100, of such institution and may share at least some hardware, software, and/or other resources with such other systems and environments.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art in light of the present description that, although FIG. 2 illustrates the user interface 220, network interface 240, memory apparatus 250, and processing apparatus 230 as separate blocks in the block diagram, these separations may be merely conceptual. In other words, in some instances, the user interface 220, for example, is a separate and distinct device from the processing apparatus 230 and the memory apparatus 250 and therefore may have its own processor, memory, and software. In other instances, however, the user interface 220 is directly coupled to or integral with at least one part of the processing apparatus 230 and at least one part of the memory apparatus 250 and includes the user interface input and output hardware used by the processing apparatus 230 when the processing apparatus 230 executes user input and output software stored in the memory apparatus 250.

As will be described in greater detail below, in one embodiment, the identification system 200 is entirely contained within a user terminal, such as a personal computer or mobile terminal, while, in other embodiments, the identification system 200 includes a central computing system, one or more network servers, and one or more user terminals in communication with the central computing system via a network and the one or more network servers. FIG. 2 is intended to cover both types of configurations as well as other configurations that will be apparent to one of ordinary skill in the art in view of this disclosure.

The user interface 220 includes hardware and/or software for receiving input into the identification system 200 from a user and hardware and/or software for communicating output from the identification system 200 to a user. In some embodiments, the user interface 220 includes one or more user input devices, such as a keyboard, keypad, mouse, microphone, touch screen, touch pad, controller, and/or the like. In some embodiments, the user interface 220 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 240 is configured to receive electronic input from other devices in the network 104, including the data store 110. In embodiments, the network interface 240 is further configured to send electronic output to other devices in a network.

The processing apparatus 230 includes circuitry used for implementing communication and logic functions of the identification system 200. For example, the processing apparatus 230 may include a digital signal processor device, a microprocessor device, and various analog-to-digital converters, digital-to-analog converters, and other support circuits. Control and signal processing functions of the identification system 200 are allocated between these devices according to their respective capabilities. The processing apparatus 230 may include functionality to operate one or more software programs based on computer-readable instructions thereof, which may be stored in the memory apparatus 250. As described in greater detail below, in one embodiment the memory apparatus 250 includes a modeling application 260 stored therein for instructing the processing apparatus 230 to perform one or more operations of the procedures described herein and in reference to FIGS. 3 and 4. Some embodiments may include other computer programs stored in the memory apparatus 250.

In general, the memory apparatus 250 is communicatively coupled to the processing apparatus 230 and includes at least one non-transitory computer-readable storage medium for storing computer-readable program code and instructions, as well as data stores containing data and/or databases. More particularly, the memory apparatus 250 may include volatile memory, such as volatile Random Access Memory (RAM) including a cache area for the temporary storage of data. The memory apparatus 250 may also include non-volatile memory that can be embedded and/or may be removable. The non-volatile memory can, for example, comprise an EEPROM, flash memory, or the like. The memory apparatus 250 can store any of a number of pieces of information and data used by the identification system 200 to implement the functions of the identification system 200 described herein.

In the illustrated embodiment, the memory apparatus 250 includes data stores containing entertainment professionals data 252, facial data 254, and trait-qualification data 256. According to some embodiments, entertainment professionals data 252 includes, for example, a list of individuals who are considered or would like to be considered a professional actor or model. According to some embodiments, the facial data 254 includes facial data for each of the individuals provided in the entertainment professionals data 252. According to some embodiments, the facial data 254 is a digital image of the individual. For example, the digital image may be organized and stored in a standard image file format, such as a JPEG, JFIF, GIG, PNG, TIFF, PDF, etc. It should be appreciated that the facial data is arranged in a vector format or raster format and is sufficient in size to identify the ideal face and/or facial feature(s), yet small enough in size to be easily searched in a reasonable amount of time.

Further, according to some embodiments, the trait-qualification data 256 includes trait and/or qualification data for each of the individuals listed in the entertainment professionals data 252. For example, the trait and/or qualification data 256 includes text descriptions of physical and/or character traits and/or qualifications for each individual. For example, the trait/qualification information for an individual may include gender, height, weight, ethnicity, ability to speak a particular language, star power, Star Meter™, popularity, and/or guild affiliation(s).

As discussed in more detail below, in some embodiments, linkages may be provided between the individuals of the entertainment professionals data 252 and the corresponding facial data 254 and trait-qualification data 256. Further, in some embodiments, entertainment professionals data 252, facial data 254, and/or trait-qualification data 256 may be received from a user via the user interface 220, or may be obtained through electronic communication with another device, which may obtain the data from external data sources via the network 104 and then stored in the memory apparatus 250.

For the sake of clarity and ease of description, the figures provided herein generally illustrate the entertainment professionals data 252, the facial data 254, and the trait-qualification data 256 as each being separate from one another. However, it will be understood that, in some embodiments, these data stores may be combined or the data described as being stored within such data stores may be further separated into additional data stores. For example, in some embodiments, the entertainment professionals data 252 includes the facial data 254 and the trait-qualification data 256.

In one embodiment, data within each of the three data stores shown in FIG. 2 may be linked to, and thus organized around, a unique identification stored in the memory apparatus 250. In such case, unique identifications are assigned to each of the individuals. Thus, each identification is linked within the memory apparatus 250 to: (1) information relating to the individual in the entertainment professionals data 252; (2) facial data relating to the individual within the facial data 254; and (3) trait and/or qualification data relating to the individual within the trait-qualification data 256. The identifications may be input by the user via the user interface 220, and may be stored by the processing apparatus 230 in any of the three data stores or in a separate data store within the memory apparatus 250. Furthermore, the user may also create the linkages in the memory device 250 between the identifications and the data within the three data stores utilizing the user interface 220.

As further illustrated by FIG. 2 and as briefly mentioned above, the memory apparatus 250 also includes the modeling application 260. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, the modeling application 260 includes computer-readable instructions for instructing the processing apparatus 230 and/or other devices to perform one or more of the functions described herein, such as one or more of the functions described in FIGS. 3 and 4.

Figure 3:
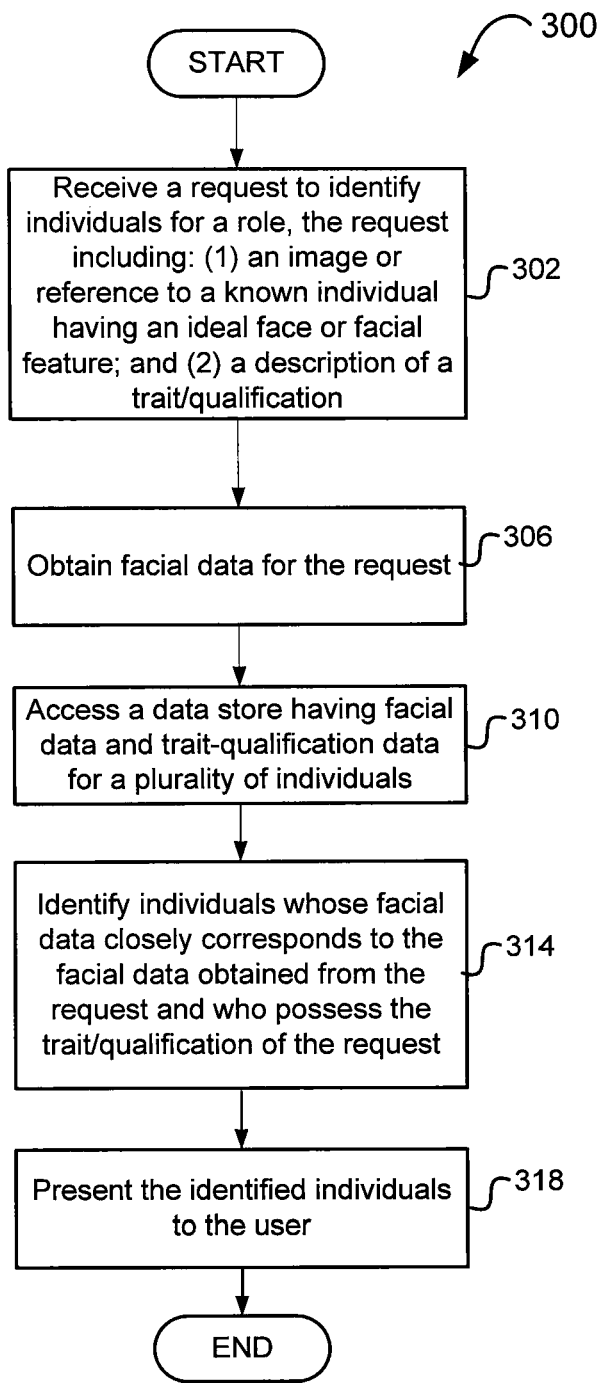
FIG. 3 provides a flow diagram illustrating a process whereby the system of FIG. 2 is used to identify one or more individuals.

FIG. 3 provides a flow diagram illustrating a process 300 whereby the identification system 200 is used to identify one or more individuals: (1) whose face matches or closely resembles a target face, or who has a facial feature or combination of facial features that matches or closely resembles a target facial feature or combination of facial features; and (2) who possesses at least one target trait and/or qualification. For example, the process 300 can be executed in the identification system 200 to identify an individual(s), such as an actor or model, whose face closely resembles a face that is ideal for a role, such as a role in a recorded or live performance, a photo shoot, or a fashion show, and who possesses a trait(s) and/or qualification(s), such as gender, height, weight, race, ability to speak a particular language, star power, experience in a particular type of role, or a guild affiliation, that is preferable for an individual cast in the role to possess.

Referring to FIG. 3, as represented by block 302, according to some embodiments, the identification system 200 receives via the user interface 220 an image of an ideal face or an ideal facial feature for the role. The ideal face or facial feature is sometimes referred to herein as the target face or facial feature. Further, in some embodiments, the identification system 200 receives images of various facial features, the combination of which would create an ideal face for the role. Further, as represented by block 302, according to some embodiments, instead of receiving an image, the identification system 200 receives via the user interface 220 reference to an individual who has an ideal face or facial feature for the role. Further, according to some embodiments, the identification system 200 may receive reference to a facial feature of one known individual and reference to a facial feature of another known individual, and an indication that a face having a combination of the facial features would be an ideal face for the role. After receiving the request, as indicated at block 306, the processing apparatus 230 obtains facial data for the images and/or references made in the request.

Figure 4:
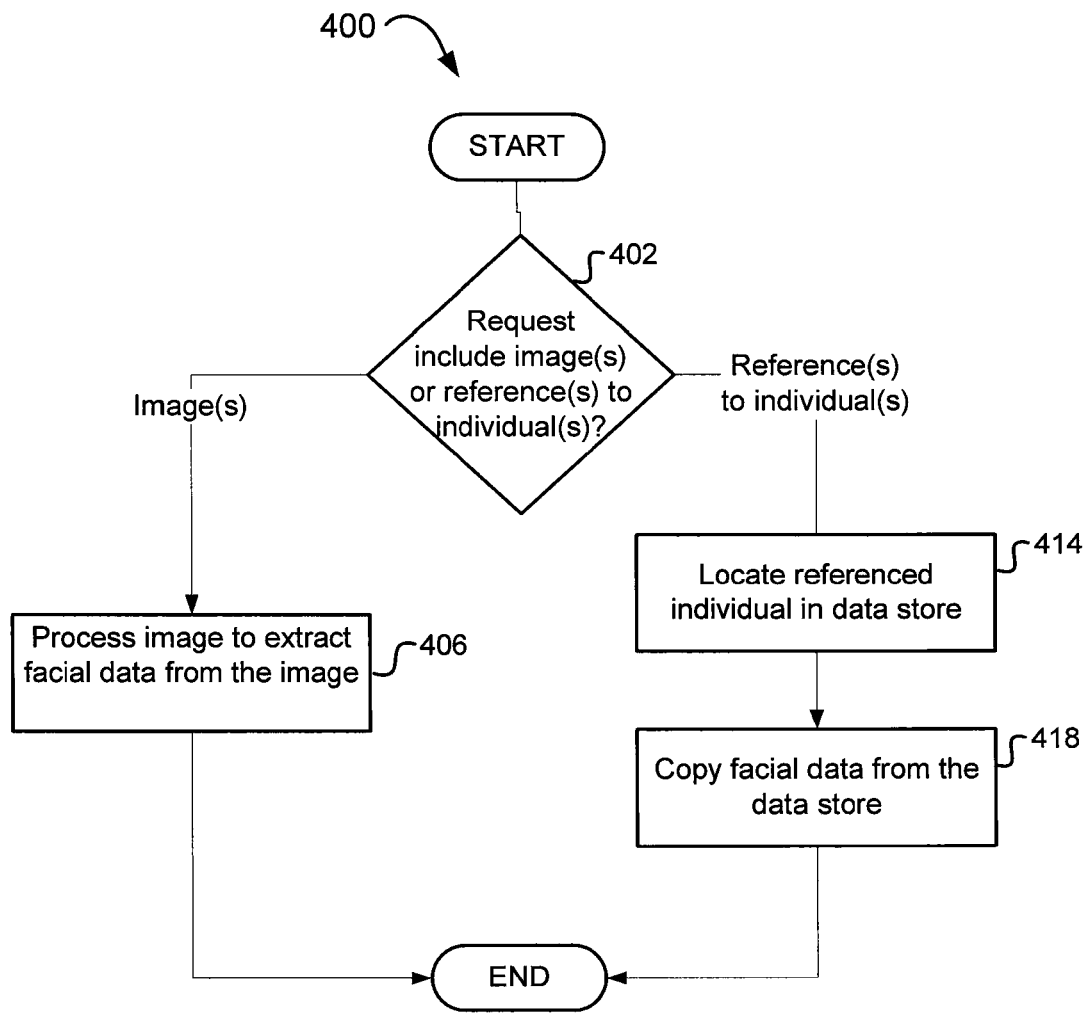
FIG. 4 provides a flow diagram illustrating a process used to obtain facial data, in accordance with at least one embodiment.

FIG. 4 provides a flow diagram illustrating an example process 400 whereby the identification system 200 obtains facial data for the request. As indicated at block 402, the modeling application 260 first instructs the processing apparatus 230 to determine whether the request included an image or images of an ideal face or ideal facial features; or whether the request included a reference to a known individual that has an ideal face. If the request included image(s) of an ideal face or ideal facial features, then, as indicated at block 406, the modeling application 260 instructs the processing apparatus 230 to process the image(s) to extract facial data from them.

Referring again to the decision block indicated at block 402, if the request included a reference to a known individual that has an ideal face or an individual(s) that has an ideal facial feature(s), then, as indicated at block 414, the modeling application 260 instructs the processing apparatus 230 to locate images of the referenced individual or individuals in any of the three data stores or in a separate data store within the memory apparatus 250. For example, in an embodiment, the modeling application 260 instructs the processing apparatus to access the entertainment professionals data 252 of the memory apparatus 230 to locate the referenced individual or individuals. Next, as represented at block 418, the modeling application 260 instructs the processing apparatus 230 to access the facial data 254 and copy the located individual's or individuals' facial data.

Referring again to FIG. 3, after facial data has been obtained, the modeling application 260 instructs the processing apparatus to access the data stores of the memory apparatus 250. For example, according to some embodiments, the modeling application 260 instructs the processing apparatus 230 to access the facial data 254 and the trait-qualification data 256. Then, as indicated at block 314, the modeling application 260 instructs the processing apparatus 230 to identify individual(s): (1) whose facial data closely corresponds to the facial data obtained according to the step represented at block 306; and (2) who have the preferred trait(s) and/or qualification(s) that were provided in the request. According to some embodiments, a 2-D based methodology is used to match the facial data of the ideal face or facial features with the facial data of the at least one individual. For example, such 2-D based methodology is a principal component analysis.

Figure 5:
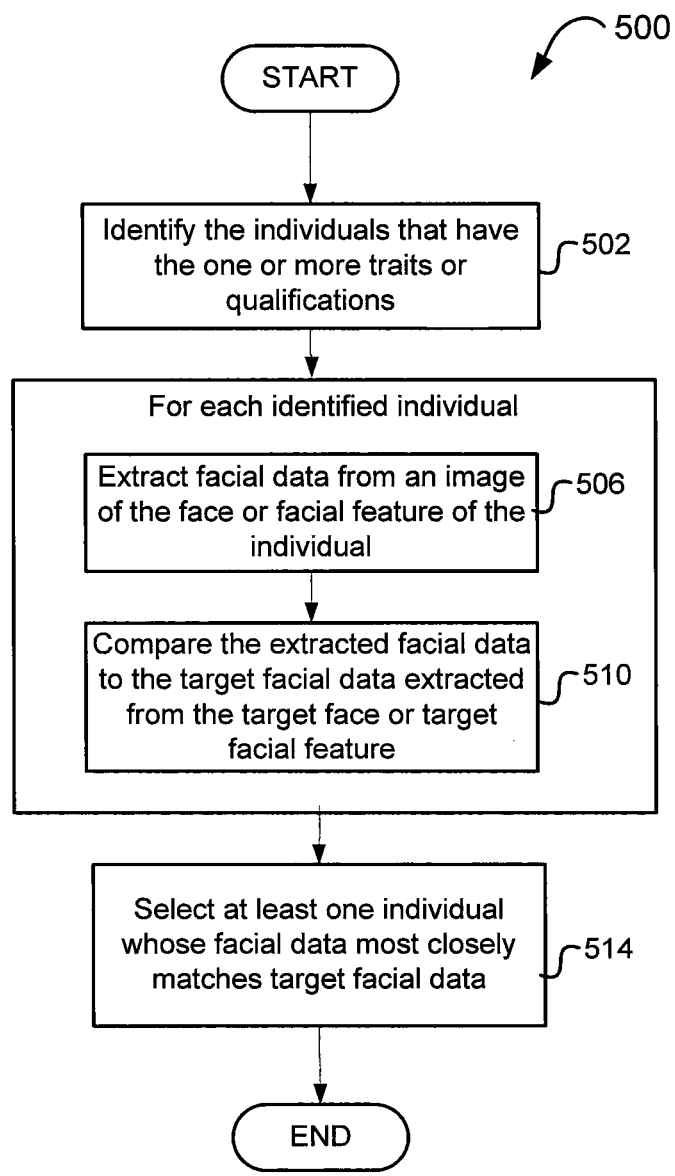
FIG. 5 provides a flow diagram illustrating an example process whereby the system of FIG. 2 is used to identify individuals whose facial data closely corresponds to the facial data obtained from a casting request and who possess the requested trait or qualification, in accordance with at least one embodiment.

FIG. 5 provides a flow diagram illustrating an example process 500 whereby the identification system 200 identifies facial data of individuals that closely corresponds to the facial data obtained from the casting request and who possesses the at least one trait or qualification provided in the casting request. For example, after receiving a casting request that includes at least one image of a target face or target facial feature and one or more traits or qualifications, and after processing the image of the target face or target facial feature to extract facial data that represents the target face or target facial feature, the modeling application 260, as indicated at block 502, instructs the processing apparatus 230 to access the data stores of the memory apparatus 250 and identify the individuals that have the one or more traits or qualifications that were provided in the casting request. Then, for each identified individual having the one or more traits or qualifications, the modeling application 260, as indicated at block 506, instructs the processing apparatus 230 to extract facial data from one or more images of the individual's face or facial features, where the one or more images are stored in the memory apparatus 250 and associated with the identified individual. Accordingly, in some embodiments, the extracted facial data is representative of the face or at least one facial feature of the individual. Then, the modeling application 260, as indicated at block 510, instructs the processing apparatus 230 to compare the facial data of the individual to the target facial data extracted from the image of the target face or target facial feature and then, as indicated at block 514, identify at least one individual whose facial data closely matches the target facial data.

According to some embodiments, the modeling application 260 instructs the processing apparatus 230 to rank-order the individuals who were identified as individuals having facial data that closely matches the target facial data. For example, the modeling application 260 instructs the processing apparatus 230 to identify a number of individuals whose facial data closely resembles the target facial data and then rank-order those identified individuals based on the degree of similarity between each individual's facial data and the target facial data. In this example, the individual whose facial data is most similar to the target facial data would be ranked first and the individual whose facial data is least similar to the target facial data would be ranked last. According to some embodiments, to rank-order individuals based on degree of similarity, the modeling application 260 instructs the processing apparatus 230 to calculate a similarity score for each individual and then rank-order the individuals using the similarity scores. These similarity scores represent the degree of similarity between each individual's facial data and the target facial data. According to some embodiments, similarity scores are determined using mathematical models, such as cosine similarity models.

The individuals identified according to the step indicated at block 314 may be suitable for the role because their face resembles the target face for the role or they have a facial feature or a combination of facial features that is ideal for the role, and because they possess the preferred trait(s) and/or qualification(s) for the role. Accordingly, as indicated at block 318, the modeling application 260 instructs the processing apparatus 230 to present the identified individuals to the user via the user interface 220. Instead of having to review the headshot of all individuals whose resume lists the preferred trait(s) and/or qualification(s) to determine whether the individual has the right look for a role, a person or entity responsible for identifying individuals may use embodiments of the identification system 200 to identify individuals who, in addition to having the preferred trait(s) and/or qualification (s), have an ideal face or ideal facial feature(s) for the role. Reviewing only the individuals identified by the identification system 200 saves the person or entity time by eliminating the need for that person or entity to review the headshots of individuals who have the trait(s) and/or qualification(s), but whose faces do not closely resemble an ideal face or have ideal features.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer-readable media for containing code, or portions of code, may include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by a system device. Program modules, program components and/or programmatic objects may include computer-readable and/or computer-executable instructions, of and/or corresponding to, any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of identifying at least one actor for a role based on facial resemblance and at least one trait or qualification, the method comprising:
    under the control of one or more computer systems configured with executable instructions,
        receiving a casting request including at least one image of a target face or target facial feature and one or more traits or qualifications;
        processing the image of the target face or target facial feature to extract target facial data that represents the target face or target facial feature, wherein the target facial data is in a digital image format;
        analyzing data for each of a plurality of actors to identify actors having the one or more traits or qualifications;
        for each identified actor having the one or more traits or qualifications,
            extracting facial data from one or more images of the identified actor, the facial data being representative of the face or at least one facial feature of the actor, wherein the facial data is in a digital image format; and
            comparing the facial data representative of the face or at least one facial feature of the actor to the target facial data that represents the target face or target facial feature; and
        selecting at least one actor in response to the casting request whose facial data most closely matches the target facial data.

2. The method of claim 1, wherein a 2-D based methodology is used to select the at least one actor whose facial data most closely matches the target facial data.

3. The method of claim 2, wherein the 2-D based methodology is a principal component analysis.

4. The method of claim 1, wherein the target face or facial feature is ideal and the at least one trait or qualification is desirable for a role in a photo shoot, a fashion show, or a recorded or live performance.

5. The method of claim 1, wherein the at least one trait or qualification is selected from a group consisting of a gender, an ethnicity, a height, a weight, a body type, a language spoken, a guild affiliation, a number of credits, a country of citizenship, and a country or city of residence.

6. A computer-implemented method of identifying an individual having a face or a facial feature similar to an ideal face or facial feature and possessing at least one qualifying trait or qualification, the method comprising:
    under the control of one or more computer systems configured with executable instructions,
        receiving an indication of the at least one trait or qualification;
        receiving facial data representative of the ideal face or facial feature;

searching at least one data store having facial data and trait or qualification data of each of a plurality of individuals; and identifying at least one individual whose facial data closely corresponds to the facial data of the ideal face or facial feature and whose trait or qualification data includes the at least one qualifying trait, wherein the facial data is in a digital image format.

7. The method of claim 6, further comprising:

calculating a similarity score for each individual identified as being at least one individual whose facial data closely corresponds to the facial data of the ideal face or facial feature and whose trait or qualification data includes the at least one qualifying trait, the similarity score representing the degree of similarity between the facial data of the identified at least one individual and the facial data of the ideal face or facial feature; and ranking-ordering the identified individuals based on the similarity scores.

8. The method of claim 6, wherein receiving facial data comprises:

receiving an image of an ideal face or facial feature; and
processing the image to extract facial data representative of the ideal face or facial feature.

9. The method of claim 6, wherein receiving facial data comprises:

receiving a reference to a known individual who has an ideal face or facial feature;

accessing a data store having facial information representative of the face or facial feature of the known individual; and obtaining facial data representative of the face or facial feature of the known individual.

10. The method of claim 6, wherein identifying the at least one individual whose facial data closely corresponds to the facial data representative of the ideal face or facial feature comprises:

comparing the facial data representative of the ideal face or facial feature to facial data of each of the individuals in the data store.

11. The method of claim 10, wherein the facial data representative of the ideal face or facial feature is a combination of facial data representative of a first facial feature of a first individual and facial data representative of a second facial feature of a second individual.

12. The method of claim 11, where the at least one individual whose facial data closely corresponds to the facial data of the ideal face or facial feature has facial data that corresponds to the combination of facial data representative of the first facial feature of the first individual and facial data representative of the second facial feature of the second individual.

13. A computer-implemented method of identifying an individual whose a face has a combination of ideal facial features and who possesses at least one qualifying trait or qualification, the method comprising:

under the control of one or more computer systems configured with executable instructions, receiving a reference to a first facial feature of a first known individual and a reference to a second facial feature of a second known individual;

receiving a description of a trait or qualification;

accessing at least one data store to obtain facial data representative of the first facial feature of the first known individual and facial data representative of the second facial feature of the second known individual; and searching the at least one data store to identify at least one individual whose facial data includes facial data that closely corresponds to the facial data that represents the first facial feature of the first known individual and facial data that closely corresponds to the facial data that represents the second facial feature of the second known individual, wherein the facial data is in a digital image format.

14. The method of claim 13, wherein the first facial feature of the first known individual is a nose.

15. The method of claim 13, wherein the first facial feature of the second known individual is a set of eyes.

16. A computer program product embedded in a non-transitory computer-readable medium for identifying an individual having a face or a facial feature similar to an ideal face or facial feature and possessing at least one qualifying trait or qualification, comprising:

program code for receiving an indication of the at least one trait or qualification;

program code for receiving facial data representative of the ideal face or facial feature;

program code for searching at least one data store having facial data and trait or qualification data of each of a plurality of individuals; and program code for identifying at least one individual whose facial data closely corresponds to the facial data of the ideal face or facial feature and whose trait or qualification data includes the at least one qualifying trait, wherein the facial data is in a digital image format.

17. The computer program product of claim 16, wherein receiving facial data comprises:

receiving an image of an ideal face or facial feature; and
processing the image to extract facial data representative of the ideal face or facial feature.

18. The computer program product of claim 16, wherein receiving facial data comprises:

receiving a reference to a known individual who has an ideal face or facial feature;

accessing a data store having facial information representative of the face or facial feature of the known individual; and obtaining facial data representative of the face or facial feature of the known individual.

19. The computer program product of claim 16, wherein identifying the at least one individual whose facial data closely corresponds to the facial data representative of the ideal face or facial feature comprises:

comparing the facial data representative of the ideal face or facial feature to facial data of each of the individuals in the data store.

20. The computer program product of claim 19, wherein the facial data representative of the ideal face or facial feature is a combination of facial data representative of a first facial feature of a first individual and facial data representative of a second facial feature of a second individual.

21. The computer program product of claim 20, where the at least one individual whose facial data closely corresponds to the facial data of the ideal face or facial feature has facial data that corresponds to the combination of facial data representative of the first facial feature of the first individual and facial data representative of the second facial feature of the second individual.

22. A system for identifying an individual having a face or a facial feature similar to an ideal face or facial feature and possessing at least one qualifying trait or qualification, comprising:

a processor; and a memory device including instructions that, when executed by the processor, cause the processor to:
- to receive an indication of the at least one trait or qualification;
- to receive facial data representative of the ideal face or facial feature;
- to search at least one data store having facial data and trait or qualification data of each of a plurality of individuals; and
- to identify at least one individual whose facial data closely corresponds to the facial data of the ideal face or facial feature and whose trait or qualification data includes the at least one qualifying trait, wherein the facial data is in a digital image format.

23. The system of claim 22, wherein the memory device further includes instructions that, when executed by the processor, cause the processor to:
- receive an image of an ideal face or facial feature; and
- process the image to extract facial data representative of the ideal face or facial feature.

24. The system of claim 22, wherein receiving facial data comprises:
- receiving a reference to a known individual who has an ideal face or facial feature;
- accessing a data store having facial information representative of the face or facial feature of the known individual; and
- obtaining facial data representative of the face or facial feature of the known individual.

25. The system of claim 22, wherein identifying the at least one individual whose facial data closely corresponds to the facial data representative of the ideal face or facial feature comprises:
- comparing the facial data representative of the ideal face or facial feature to facial data of each of the individuals in the data store.

26. The system of claim 25, wherein the facial data representative of the ideal face or facial feature is a combination of facial data representative of a first facial feature of a first individual and facial data representative of a second facial feature of a second individual.

* * * * *